United States Patent Office 2,838,472
Patented June 10, 1958

2,838,472

VULCANIZATION OF SILICONE RUBBER

Glennard R. Lucas, Schenectady, N. Y., assignor to General Electric Company, a corporation of New York No Drawing. Application January 6, 1955
Serial No. 480,271

10 Claims. (Cl. 260—46.5)

This invention is concerned with the vulcanization of silicone rubber. More particularly, the invention is concerned with improved vulcanizing agents for silicone rubber comprising a finely divided peroxide selected from the class consisting of benzoyl peroxide and bis(2,4-dichlorobenzoyl) peroxide (hereinafter referred to as "dichlorobenzoyl peroxide"), in which at least 95 percent of the particles of the peroxide have an average particle diameter of less than 12 microns and essentially 100 percent of the particles of the peroxide are below 20 microns. The invention also includes mixtures of the above finely divided peroxides with organopolysiloxanes convertible, for instance, by heat to the cured or vulcanized, solid, elastic state.

Benzoyl peroxide and dichlorobenzoyl peroxide having the formula

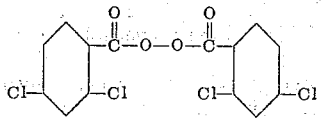

have been the main curing agents for silicone rubber. In combination with fillers, the vulcanizable silicone rubber and the curing agent when subjected to heat under the usual conditions yields products having tensile strengths of about 700 to 800 lb. per sq. in. and percents elongation of about 200 to 300 percent. In general use, these peroxides have had average particle sizes of about 25 to 50 microns, in which from 90 to 100 percent of the particles were within this range.

Unexpectedly, I have discovered that by employing benzoyl peroxide or dichlorobenzoyl peroxide whose particles have a lower range of average particle size, I am able to obtain marked increases in tensile strength with significant increases in the percent elongation of the cured, vulcanized products. In addition, the tendency to scorch is greatly reduced, and I am able to cure the silicone rubber at higher temperatures in shorter periods of time than has been heretofore possible without the danger of causing "blowing" of the cured product. These results are obtained by employing one or both of the above-mentioned peroxides in a finely divided state as the curing agent, and in particular employing the peroxide in a state in which at least 95 percent of the particles have an average particle size below 15 microns and about 100 percent have an average particle size below 20 microns.

As an added advantage of using the finely divided peroxides, I have found that I can use less of the peroxides to obtain the improved results described above. This ability to use less peroxide is important in the use of the cured product at elevated temperatures, since there would be less of the degradation products of the peroxide available to exert harmful effects on the vulcanized material.

The convertible silicone compositions, which may be highly viscous masses or gummy elastic solids, depending on the state of condensation, the condensing agent employed, the starting organopolysiloxane used to make the convertible organopolysiloxane, etc., will hereinafter be referred to as "convertible organopolysiloxane" or, more specifically, as "convertible methylpolysiloxane." These convertible organopolysiloxanes are generally obtained by condensation of liquid organopolysiloxanes containing an average of from about 1.95, preferably from about 1.98, to about 2.05 organic groups per silicon atom, employing the usual condensing agent, such as ferric chloride hexahydrate, phenylphosphoryl chloride; alkaline condensing agents, such as potassium hydroxide, cesium hydroxide, etc. These convertible organopolysiloxanes may contain the same or different silicon-bonded organic substituents attached directly to the silicon by carbon-silicon linkages, for example, methyl, ethyl, propyl, phenyl, tolyl, xylyl, benzyl, phenylethyl, naphthyl, chlorophenyl, both methyl and phenyl, etc. radicals. In general, it is desired that the siloxane units consist of units of the structural formula $R_2SiO$, where R is preferably a radical of the group consisting of methyl and phenyl radicals, and at least 90 percent of the total number of R groups are alkyl, for instance, methyl radicals. The polysiloxane may be one in which all of the siloxane units are $(CH_3)_2SiO$, or the siloxane may be copolymer of dimethylsiloxane with a minor amount, e. g., from 1 to 30 mol percent, of any of the following units alone or in combination therewith:

$$C_6H_5(CH_3)SiO$$

and $$(C_6H_5)_2SiO$$

The presence of silicon-bonded alkenyl radicals, such as vinyl groups, is not precluded.

A more particular description of the convertible organopolysiloxanes which may be employed in the practice of the present invention may be found disclosed in the patent of Richard M. Savage, U. S. 2,671,069, issued March 2, 1954, and assigned to the same assignee as the present invention, which by reference is made part of the disclosures of the present application.

The amount of benzoyl peroxide or dichlorobenzoyl-peroxide employed as cure accelerator for the convertible organopolysiloxane may be varied within wide limits and may range from about 0.5 to about 8 percent or more, by weight, based on the weight of the convertible organopolysiloxane. In general, we preferably use from about 1 to 5 percent, by weight, of the peroxide.

The method for preparing the peroxide having the average particle size recited above for the benzoyl peroxide and the dichlorobenzoyl peroxide requires special techniques. Mere grinding of the peroxide under usual conditions will not give the desired product. I have found that a specific process enables one to obtain readily the peroxide in the finely divided form in which essentially all, i. e., almost 100 percent of the particles, have an average particle diameter of below 12 microns. In accordance with my process, wherein benzoyl peroxide will be taken as an example, an aqueous slurry or suspension of benzoyl peroxide is filtered to give a moisture-containing benzoyl peroxide having in excess of 20 percent, by weight, water. This moisture-containing benzoyl peroxide is then dehydrated to give a product of which 2 to 5 percent, by weight, was water. The benzoyl peroxide itself (if completely dry) would be 98 percent peroxide, the balance being essentially sodium chloride resulting from the manner by which it was prepared. The amount of water present is important; if all the water is removed of if there is less than 2 percent water in the peroxide, upon grinding, the finely divided particles will agglomerate to give much larger size diameter materials, which will not give the same results. The slightly damp benzoyl peroxide is then mixed with a low viscosity silicone oil, for instance, a trimethylsiloxy end-blocked dimethylpolysiloxane of about 50 to 3,000 centipoise viscosity such as those described and claimed in Patnode Patents 2,469,888 and 2,469,890, issued May 10, 1949, in such proportion that the benzoyl peroxide comprises from about 25 to 75 percent, preferably around 50 percent, of the total weight of the mixture. Thereafter, this mixture of damp benzoyl peroxide and the silicone oil is passed repeatedly through a three-roll paint mill until one obtains a product which has the appearance of stiff whipped cream. If less than 2 percent water is used in the peroxide, one will obtain an oily paste, in which the benzoyl peroxide will be in an agglomerated form and of little advantage.

The passage through the paint mill is conducted in a manner whereby the nip is tightened as much as is possible, but still capable of passing the mixture through the rolls, while advantageously maintaining the temperature of the paint mill below about 50° C., for instance, from about 15° to about 35° C. Generally, only up to 5 passes through the tightened nip of the three-roll paint mill are required, although the number of passes will vary with such considerations as the size of the rolls, the speed of the rolls, the closeness of the rolls, etc. If one employs the above method of making the finely-divided benzoyl peroxide, one will find that at least 95 percent of the benzoyl peroxide particles have an average particle diameter below 12 microns, and essentially all will have an average particle size diameter below 20 microns. Preferably, it is desirable that 100 percent of the particles have an average particle diameter of less than 10 microns, e. g., from 2 to 8 microns. Other methods for preparing the finely divided benzoyl peroxide are disclosed in my copending application Serial No. 480,272, filed concurrently herewith and assigned to the same assignee as the present invention, now abandoned.

In order that those skilled in the art may better understand how the present invention may be practiced, the following example is given by way of illustration and not by way of limitation. All parts are by weight.

*Example 1*

A highly viscous, convertible methylpolysiloxane was prepared by condensing at a temperature of about 140° C. for about six hours octamethylcyclotetrasiloxane with about 0.01 percent, by weight, of potassium hydroxide. This polymer was soluble in benzene and had only slight flow at room temperature.

*Example 2*

Samples were made of the above-identified convertible methylpolysiloxane using a finely divided silica aerogel (Santocel CS sold by Monsanto Chemical Company), as a filler employing in the formulation 36 parts of the convertible methylpolysiloxane, 15.5 parts of the silica aerogel, and 1.18 parts of the above finely divided methylpolysiloxane-benzoyl peroxide mixture in which about 100 percent of the benzoyl peroxide particles had an average particle diameter size of less than 10 microns, and prepared as described above. As a control, similar formulations were prepared as above with the exception that the benzoyl peroxide used had substantial (between 25 to 50 percent, by weight, of the particles) amounts of particles of an average particle size diameter between about 25 to 50 microns. About 14 samples of the formulation using the more finely divided benzoyl peroxide and about 20 samples of the formulation using the larger particle size benzoyl peroxide were molded into the form of flat sheets (from which test specimens could be cut) at about 130° C. for about 15 minutes at a pressure of approximately 500 p. s. i., and thereafter the samples were removed and further heat-aged in an air circulating oven for 24 hours at 250° C. Each of the samples was tested for tensile strength and elongation with the following results.

Whereas the average of the tensile strength and elongation of the samples using the more finely divided benzoyl peroxide was 910 p. s. i. tensile and 295 percent elongation, the average of the samples using the larger particle size benzoyl peroxide had a tensile of 712 p. s. i. and a percent elongation of 263 percent. In both instances, the hardness of all the samples was essentially the same.

*Example 3*

A methyl phenylpolysiloxane convertible to the cured, insoluble, elastic state by means of a peroxide was obtained similarly as described in Example 1, with the exception that about 15 mol percent of octaphenylcyclotetrasiloxane was added to the octamethylcyclotetrasiloxane during condensation of the latter with the potassium hydroxide. This convertible methyl phenylpolysiloxane was then mixed with silica aerogel similarly as was done in Example 2, and using in one instance, the above-described finely divided benzoyl peroxide and in another instance using the coarser benzoyl peroxide in such proportion that there were present 36.5 parts of the methyl phenylpolysiloxane, 14.6 parts silica aerogel, and 1.37 parts of the respective peroxides. Samples of each formulation were molded and heat-treated similarly as was done in Example 2, so that the formulation using the coarser benzoyl peroxide was employed in eight samples which the benzoyl peroxide of finer constitution was used in ten formulations. The average physical properties of the samples using the coarser benzoyl peroxide was 659 p. s. i. tensile and 254 percent elongation. In contrast to this, the formulation employing the more finely divided benzoyl peroxide within the scope of the present invention showed a tensile strength of 866 p. s. i. and a percent elongation of 282 percent.

It will, of course, be apparent to those skilled in the art that in addition to the convertible organopolysiloxanes employed above and the benzoyl peroxide, one may use dichlorobenzoyl peroxide and other convertible organopolysiloxanes, many examples of which are described above and in the aforementioned Savage patent. In addition to the advantages defined above, one can also derive improvements in tear strength. Thus, it was found that the tear strength of the samples in Example 2 using the more finely divided benzoyl peroxide showed 86 pounds, whereas samples using the coarser benzoyl peroxide had a tear strength of 54.5 pounds.

In addition to the finely divided silica filler described above, other silica fillers as well as other fillers such as, for instance, titanium dioxide, calcium silicate, ferric oxide, chromic oxide, cadmium sulfide, asbestos, glass fibers, calcium carbonate, carbon black, lithopone, talc, etc., may be incorporated in varying amounts, for instance, from about 0.15 to 3 parts, by weight, of filler per part of the convertible organopolysiloxane. Obviously, the amount of curing agent may be varied widely without departing from the scope of the invention. The molding conditions can obviously be varied, e. g., one may use temperatures of from 125 to 250° C. for times ranging from 1 to 10 or more hours to obtain cured products. The incorporation of various additives such as anti-oxidants, compression set additives such as mercury and salts of mercury, various quinones such as 2,5-ditertiary butyl quinone, etc., is not precluded.

The silicone rubber cured with the benzoyl peroxide or dichlorobenzoyl peroxide is useful in such applications as, for instance, gaskets, tubing, electrical insulation (e. g., as conductor insulation, etc.), shock absorbers, etc. Because of their resistance to heat, they are valuable as materials for use in applications where natural or other synthetic rubbers fail, owing to the deleterious effect of heat. Elastomers produced by the practice of my invention have the additional property of retaining their flexibility at low temperatures, for example, at temperatures as low as −60° C., especially when silicon-bonded phenyl groups are present in the convertible organopolysiloxane.

What I claim as new and desire to secure by Letters Patent of the United States is:

1. A curable composition of matter comprising (1) an organopolysiloxane convertible to the cured, solid, elastic state, the organic groups of the organopolysiloxane being selected from the class consisting of monovalent hydrocarbon radicals and chlorinated phenyl radicals, there being present an average of from about 1.98 to 2.05 silicon-bonded organic radicals per silicon atom, and (2) a curing agent for (1) comprising a finely divided peroxide selected from the class consisting of benzoyl peroxide and bis(2,4-dichlorobenzoyl)peroxide, in which at least 95 percent of the peroxide particles have an average particle diameter below 12 microns and essentially all the particles of the peroxide having an average particle diameter below 20 microns, the said finely divided peroxide containing from 2 to 5%, by weight, thereof of water and being in the form of a creamy dispersion in a methylpolysiloxane fluid wherein the benzoyl peroxide comprises from 25 to 75%, by weight, of the entire dispersion.

2. A curable composition of matter comprising (1) an organopolysiloxane convertible to the cured, solid, elastic state, the organic groups of the organopolysiloxane being selected from the class consisting of monovalent hydrocarbon radicals and chlorinated phenyl radicals, there being present an average of from about 1.98 to 2.05 silicon-bonded organic radicals per silicon atom, (2) from 0.1 to 8 percent, by weight, based on the weight of (1), of a finely divided peroxide selected from the class consisting of benzoyl peroxide and bis(2,4-dichlorobenzoyl)peroxide, in which at least 95 percent of the peroxide particles have an average particle diameter below 12 microns and essentially all the particles of the peroxide have an average particle diameter below 20 microns, the said finely divided peroxide containing from 2 to 5%, by weight, thereof of water and being in the form of a creamy dispersion in a methylpolysiloxane fluid wherein the benzoyl peroxide comprises from 25 to 75%, by weight, of the entire dispersion, and (3) a filler.

3. A composition of matter convertible to the cured, solid, elastic state comprising (1) a methylpolysiloxane containing an average of from 1.98 to 2.01 methyl groups per silicon atom in which all the methyl groups are attached to silicon by carbon-silicon linkages, (2) from 0.1 to 8 percent, by weight, based on the weight of (1) of a finely divided peroxide selected from the class consisting of benzoyl peroxide and bis(2,4-dichlorobenzoyl)-peroxide in which at least 95 percent of the peroxide particles have an average particle diameter below 12 microns and essentially all particles of the peroxide have an average particle diameter below 20 microns, the said finely divided peroxide containing from 2 to 5%, by weight, thereof of water and being in the form of a creamy dispersion in a methylpolysiloxane fluid wherein the benzoyl peroxide comprises from 25 to 75%, by weight, of the entire dispersion, and (3) a filler.

4. A composition of matter convertible to the cured, solid, elastic state comprising (1) a methylpolysiloxane containing an average of from 1.98 to 2.01 methyl groups per silicon atom in which all the methyl groups are attached to silicon by carbon-silicon linkages, (2) from 0.1 to 8 percent, by weight, based on the weight of (1) of a finely divided benzoyl peroxide in which at least 95 percent of the benzoyl peroxide particles have an average particle diameter below 12 microns and essentially all particles of the peroxide have an average particle diameter below 20 microns, the said finely divided peroxide containing from 2 to 5%, by weight, thereof of water and being in the form of a creamy dispersion in a methylpolysiloxane fluid wherein the benzoyl peroxide comprises from 25 to 75%, by weight, of the entire dispersion, and (3) a finely divided silica filler.

5. A composition of matter convertible to the cured, solid, elastic state comprising (1) a methylpolysiloxane containing an average of from 1.98 to 2.01 methyl groups per silicon atom in which all the methyl groups are attached to silicon by carbon-silicon linkages, (2) from 0.1 to 8 percent, by weight, based on the weight of (1) of finely divided bis(2,4-dichlorobenzoyl)peroxide in which at least 95 percent of the peroxide particles have an average particle diameter below 12 microns and essentially all particles of the peroxide have an average particle diameter below 20 microns, the said finely divided peroxide containing from 2 to 5%, by weight, thereof of water and being in the form of a creamy dispersion in a methylpolysiloxane fluid wherein the benzoyl peroxide comprises from 25 to 75%, by weight, of the entire dispersion, and (3) a finely divided silica filler.

6. A composition of matter convertible to the cured, solid, elastic state comprising (1) a methyl phenylpolysiloxane containing an average of from 1.98 to 2.01 total methyl and phenyl groups per silicon atom wherein all the aforesaid hydrocarbon radicals are attached to silicon by carbon-silicon linkages, (2) from 0.1 to 8 percent, by weight, based on the weight of (1) of a finely divided benzoyl peroxide in which at least 95 percent of the benzoyl peroxide particles have an average particle diameter below 12 microns and essentially all particles of the peroxide have an average particle diameter below 20 microns, the said finely divided peroxide containing from 2 to 5%, by weight, thereof of water and being in the form of a creamy dispersion in a methylpolysiloxane fluid wherein the benzoyl peroxide comprises from 25 to 75%, by weight, of the entire dispersion, and (3) a finely divided silica filler.

7. A composition of matter convertible to the cured, solid, elastic state comprising (1) a methyl phenylpolysiloxane containing an average of from 1.98 to 2.01 total methyl and phenyl groups per silicon atom wherein all the aforesaid hydrocarbon radicals are attached to silicon by carbon-silicon linkages, (2) from 0.1 to 8 percent, by weight, based on the weight of (1) of finely divided bis(2,4-dichlorobenzoyl)peroxide in which at least 95 percent of the peroxide particles have an average particle diameter below 12 microns and essentially all particles of the peroxide have an average particle diameter below 20 microns, the said finely divided peroxide containing from 2 to 5%, by weight, thereof of water and being in the form of a creamy dispersion in a methylpolysiloxane fluid wherein the benzoyl peroxide comprises from 25 to 75%, by weight, of the entire dispersion, and (3) a finely divided silica filler.

8. The process for obtaining improved, cured, solid, elastic hydrocarbon-substituted polysiloxanes which comprises (1) incorporating in a hydrocarbon-substituted polysiloxane convertible to the cured, solid, elastic state, there being present an average of from 1.98 to 2.05 silicon-bonded hydrocarbon radicals per silicon atom, a filler and a small amount of a curing agent for the above polysiloxane comprising a finely divided peroxide selected from the class consisting of benzoyl peroxide and bis-(2,4-dichlorobenzoyl)peroxide, in which at least 95 percent of the peroxide particles have an average particle diameter below 12 microns and essentially all the particles of the peroxide having an average particle diameter below 20 microns, the said finely divided peroxide containing from 2 to 5%, by weight, thereof of water and being in the form of a creamy dispersion in a methylpolysiloxane fluid wherein the benzoyl peroxide comprises from 25 to 75%, by weight, of the entire dispersion, and (2) heating the mixture of ingredients at a temperature sufficient to effect curing of the filled hydrocarbon-substituted polysiloxane.

9. The process as in claim 8 in which the convertible hydrocarbon-substituted polysiloxane is a convertible methylpolysiloxane containing from 1.98 to 2.01 methyl groups per silicon atom wherein the methyl groups are attached directly to silicon by carbon-silicon linkages, and the filler is a finely divided silica filler.

10. The process as in claim 8 in which the convertible hydrocarbon-substituted polysiloxane is a methyl phenylpolysiloxane convertible to the cured, solid, elastic state containing from 1.98 to 2.01 total methyl and phenyl groups per silicon atom wherein all the methyl and phenyl groups are attached directly to silicon by carbon-silicon linkages, and the filler is a finely divided silica.

References Cited in the file of this patent

UNITED STATES PATENTS

| | | |
|---|---|---|
| 1,555,805 | Kroeber | Sept. 29, 1925 |
| 2,492,129 | Sprung | Dec. 20, 1949 |
| 2,541,137 | Warrick | Feb. 13, 1951 |

OTHER REFERENCES

Morel: Science et Technologie, Riv. Gen. Caoutchouc, vol. 30, No. 7, 1953, pp. 481–489.

Pfeifer et al.: India Rubber World, January 1954, vol. 129, No. 4, pp. 481–484 and 488.